(12) United States Patent
Dix et al.

(10) Patent No.: US 6,487,266 B1
(45) Date of Patent: Nov. 26, 2002

(54) SIPHON WATER RODS

(75) Inventors: Gary E. Dix, Saratoga, CA (US); James C. Shaug, Morgan Hill, CA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/690,441

(22) Filed: Oct. 18, 2000

Related U.S. Application Data

(62) Division of application No. 09/092,980, filed on Jun. 8, 1998, now Pat. No. 6,181,763.
(60) Provisional application No. 60/061,344, filed on Oct. 8, 1997.

(51) Int. Cl.[7] .................... G21C 3/322; G21C 7/32
(52) U.S. Cl. ............... 376/444; 376/210; 376/434; 376/439; 376/443; 376/377; 376/352
(58) Field of Search .................. 376/434, 443, 376/444, 435, 377, 210, 352

(56) References Cited

U.S. PATENT DOCUMENTS

| | | | |
|---|---|---|---|
| 3,528,885 A | 9/1970 | Kumpf ................ 176/78 |
| 4,708,846 A | 11/1987 | Patterson et al. .......... 376/444 |
| 4,803,044 A | 2/1989 | Patterson ................ 376/444 |
| 4,822,557 A | 4/1989 | Suzuki et al. ............. 376/282 |
| 4,876,063 A | 10/1989 | Johansson ................ 376/444 |
| 5,023,047 A | 6/1991 | Nishida et al. ............ 376/370 |
| 5,149,495 A | 9/1992 | Elkins ................... 376/444 |
| 5,164,150 A | 11/1992 | Matzner ................. 376/210 |
| 5,192,496 A | 3/1993 | Soneda et al. ............ 376/428 |
| 5,230,858 A | 7/1993 | Matzner et al. ........... 376/282 |
| 5,245,643 A | 9/1993 | Dix et al. ................ 376/371 |
| 5,251,246 A | 10/1993 | Matzner ................. 376/444 |
| 5,267,286 A | 11/1993 | Hirukawa ............... 376/353 |
| 5,528,641 A | 6/1996 | Takeuchi et al. .......... 376/444 |
| 5,553,108 A | 9/1996 | Johansson ............... 376/444 |
| 5,617,456 A | 4/1997 | Kurosaki et al. .......... 176/260 |
| 5,663,993 A | 9/1997 | Danielson et al. ......... 376/444 |
| 6,278,757 B1 * | 8/2001 | Yokomizo et al. ......... 376/377 |

FOREIGN PATENT DOCUMENTS

| | | | | |
|---|---|---|---|---|
| JP | 63-73187 | * | 4/1988 | ......... 376/377 |
| JP | 01250789 A | | 10/1989 | ......... 376/444 |
| JP | 02-205794 | * | 8/1990 | ......... 376/409 |
| JP | 03-179293 | * | 8/1991 | ......... 376/440 |
| JP | 07140281 A | | 6/1993 | ......... 376/444 |
| JP | 05-188167 | * | 7/1993 | |
| JP | 04-064089 | * | 2/1998 | ......... 376/438 |
| JP | 2000-9869 | * | 1/2000 | |

* cited by examiner

*Primary Examiner*—Michael J. Carone
*Assistant Examiner*—Jack Keith
(74) *Attorney, Agent, or Firm*—Nixon & Vanderhye P.C.

(57) ABSTRACT

A fuel bundle assembly for a boiling water nuclear reactor comprising a plurality of fuel rods having respective fuel columns therein, and arranged in an ordered array, extending between upper and lower support structures, the plurality of fuel rods enclosed within a hollow, open-ended channel member at least partially enclosed by the open-ended channel member; at least one water rod supported on the lower tie plate and extending upwardly toward the upper tie plate, the at least one water rod having an upward flow path including at least one inlet at a lower end of the upward flow path, and a downward flow path including at least one outlet at a lower end of the downward flow path, the at least one outlet located about midway along the fuel columns within the fuel rods.

4 Claims, 3 Drawing Sheets

SIPHON WATER RODS

This is a division of application Ser. No. 09/092,980, filed Jun. 8, 1998, which claims benefit of No. 60/061,344, filed Oct. 08, 1997.

TECHNICAL FIELD

This invention relates to boiling water nuclear reactors in general and to fuel bundle assemblies for such reactors in particular.

BACKGROUND

Boiling Water Reactor (BWR) fuel assemblies include fuel rods and water rods within a flow channel. Water flowing through the many fuel bundles within respective channels provide both coolant and moderator to sustain the nuclear reaction. The moderator function is provided primarily by the higher density liquid. Energy addition along the fuel rods, however, converts some of the water to lower density steam so that its effectiveness as a moderator decreases as the fraction of liquid decreases along the length of the fuel rods. The resultant steam-water flows, referred to as two-phase flows, have higher velocities and cause significant pressure drop along the length of the fuel during typical operation. To reduce this variation in liquid moderator, modem BWR fuel designs include separate flow paths within the fuel bundles which remain filled with liquid (water) over the length of the fuel bundles. These water paths can be configured as one or more round or square tubes (or as cruciform shaped flow passages) generally referred to as water rods. For normal operating conditions, these water rods provide 15% to 20% of the available moderator liquid in BWR fuel bundles.

Current water rod designs provide parallel flow paths through the fuel bundle. They typically include one or more inlet holes near the bottom of the water rods (and the fuel bundle) and one or more outlet holes near the top of the water rods (and the fuel bundle), as illustrated in FIGS. 1 and 2. The placement of these inlet and outlet holes imposes the full bundle pressure drop to drive flow through the water rods. When reactor flow reduces, the pressure difference driving liquid through water rods is also reduced. Current water rods are designed with appropriate inlet flow resistances to maintain very little vapor formation even for such low flow conditions.

A characteristic of such two-phase flow systems is that they can experience flow oscillations under certain conditions of low flow and high power operation. A BWR has a natural tendency to avoid such flow oscillations because the increased steam formed at low flow conditions causes the reactor power to reduce. However, since current water rods are typically designed to remain fill of liquid even at low reactor flow conditions, those water rods limit the natural power reduction at low flow conditions. On the other hand, if the flow restrictions in the water rods are increased to produce significant steam in the water rods at low flow conditions, the current designs result in unfavorable steam in the water rods at normal operation conditions as well.

Two recent water rod designs have been proposed to improve the prior designs mentioned above. One recent design provides varying amounts of steam in the water rod at different reactor flow conditions. This design is intended primarily to enhance spectral shift capability. It utilizes a very small (in cross section) downflow extension tube from the top of the water rod. Thus, water flows upward through a large path and then downward through a small connecting tube for nearly the full length of the fuel before reaching the exit hole. This configuration (illustrated in FIG. 3) has only a short vertical distance between the inlet and outlet holes, with resultant small imposed pressure differential across these holes. For low flow conditions, the downward flow tube is predominantly filled with steam, and the fluid in the upward path is supported like a standpipe with a low pressure differential. The resultant liquid content in the tube is thus quite low, being proportional to the imposed pressure differential. For normal operation, however, the small downflow tube and significant outlet flow restriction combine to severely limit water rod flow. Thus, this design results in significant steam formation in the water rod, with associated unfavorable fuel efficiency, under normal operating conditions.

Another recent water rod design introduces a central standpipe for upflow within a normal water rod design (illustrated in FIG. 4). Using flow restrictions typical of current designs allows for sufficient water rod flow at normal operating conditions to avoid steam formation. For low flow conditions, it was contemplated that the annular region outside of the standpipe would fill with steam when the imposed pressure differential dropped below that necessary to spill liquid over from the top of the standpipe. Unfortunately, analyses have indicated that under such conditions, liquid will flow backward through the upper outlet hole and refill that annular region outside the standpipe (since that region has no bottom drain, it can potentially collect even more liquid than current water rod designs under similar conditions). The only known way to avoid such liquid backflow at the upper outlet hole is to introduce sufficient restriction such that backflow is avoided by the counter flow effects of the escaping vapor. Unfortunately, that amount of flow restriction will again cause unfavorable steam formation in the water rod at normal operating conditions.

DISCLOSURE OF THE INVENTION

The present invention provides a water rod design that is filled with liquid at normal operating conditions but becomes partially filled with steam at low flow conditions. To this end, the water rod(s) are each configured as a siphon tube or siphon water rod (SWR). The newly designed water rods incorporate both an upflow path substantially to the top of the fuel in the fuel rods, followed by a downflow path with outlet holes positioned near the mid-plane of the fuel bundle. This change creates a water rod that operates with a siphon effect, flowing full of liquid at normal operating conditions. This is referred to as the "siphon mode" of SWR operation. However, at low reactor flow rates, a small amount of vapor formation in the water rod breaks the siphon effect and the water rod transitions to a significant (~60%) vapor content. This results in the downflow path being virtually filled with vapor, while the upflow path operates as a standpipe with a two-phase mixture. This is referred to as the "standpipe mode" of SWR operation.

For some applications, the return or downflow path may be contained within the cross-sectional area of a single water rod. For example, the downflow path could be configured as an internal tube or as an outer annulus as discussed further herein. The siphon water rod may also be configured by interconnecting the tops of two adjacent flow paths. For such an interconnected configuration, it is also possible to incorporate part-length-rods (PLR's) in the region below the downflow path, as discussed further below.

In all cases, there are two key elements to the disclosed design. First, all of the water rod flow is caused to travel upward from the bottom of the fuel bundle and then downward to the outlet near the fuel bundle mid-plane (i.e., there are no intermediate outlets along the flow path). Second, flow resistances are comparable to current water rod designs such that water rod flows are sufficient to avoid steam content during normal reactor operation(this implies the upflow and downflow portions have similar flow characteristics).

For current water rod designs, water flows are determined by the imposed pressure differential across the inlet and outlet openings minus the fluid density head within the water rod. Thus, current design water rod flow will be zero when the imposed pressure differential just equals the fluid density head in the water rod. For the designs in accordance with this invention, the water rod flow is also driven by the fuel bundle pressure differential imposed between the water rod inlet and outlet openings. However, that imposed pressure differential is significantly lower than current designs (where the outlet is at the top of the water rod) due to the outlet being placed at a much lower elevation in the fuel bundle. However, the net fluid density head working against the flow is also reduced for the siphon water rod, being the net difference between the fluid density heads in the upflow and downflow paths. Thus, when both paths of a siphon water rod are filled with liquid, it is possible to achieve relatively high flows through the water rod even with relatively low imposed pressure differentials. This is the same basic feature utilized for other siphon flow applications (although typical siphon applications make the downflow portion longer than the upflow portion in order to produce net flow even with zero pressure differential between the inlet and outlet openings).

It will thus be appreciated that SWR's can be designed such that for normal reactor operation, the flow and subcooling entering the water rod are sufficient to maintain liquid water throughout the water rod. Under such circumstances, the siphon water rod provides the same neutron moderation capability as standard water rod designs. However, significant performance difference occurs at reduced reactor flow rates. As the imposed pressure differential decreases, a small amount of steam formation occurs in both current and siphon water rod designs. However, in a siphon water rod such steam formation starts in the downflow path, reducing the fluid density head. That produces a positive feedback by further reducing the water rod flow and causing more steam formation. When sufficient steam formation occurs, the siphon effect is broken and the downflow path quickly fills mostly with steam. Under this condition, the upflow path performs like a standpipe with a density head determined by the imposed pressure differential. Thus, breaking the siphon effect provides the large reduction in water rod liquid content that is needed to improve reactor stability margins at low flow rates.

Accordingly, in its broader aspects, the present invention relates to a fuel bundle assembly for a boiling water nuclear reactor comprising a plurality of fuel rods having respective fuel columns therein, and arranged in an ordered array, extending between upper and lower tie plates, the plurality of fuel rods enclosed within a hollow, open-ended channel member at least partially enclosed by the open-ended channel member; at least one water rod supported on the lower tie plate and extending upwardly toward the upper tie plate, the at least one water rod having an upward flow path including at least one inlet at a lower end of the upward flow path, and a downward flow path including at least one outlet at a lower end of the downward flow path, the at least one outlet located about midway along the fuel columns within the fuel rods.

Other objects and advantages will become apparent from the detailed description which follows.

BEST MODE FOR CARRYING OUT THE INVENTION

Figure 1:
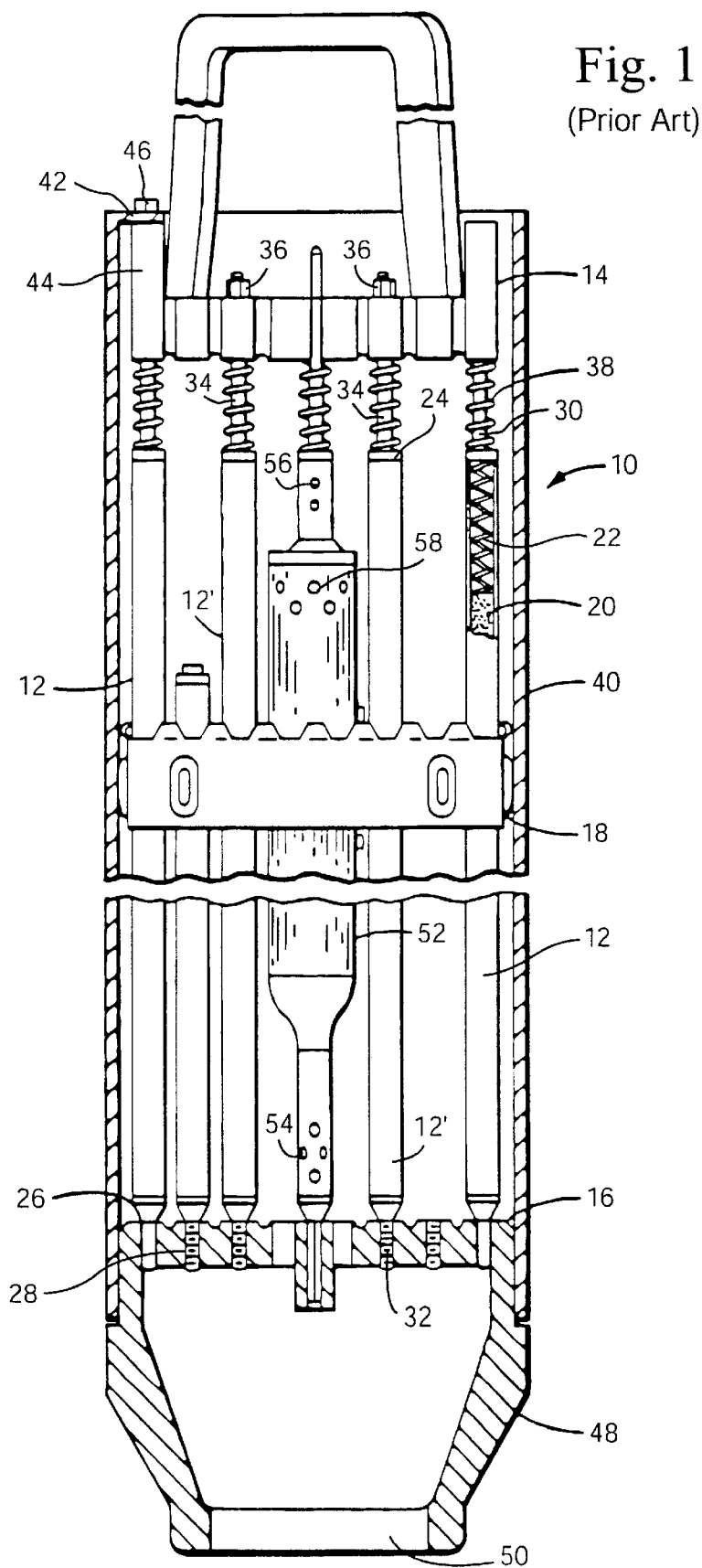
FIG. 1 is a longitudinal section view of a conventional fuel assembly.

As illustrated in FIG. 1, a fuel assembly 10 comprises a plurality of laterally spaced fuel rods 12 supported between an upper tie plate 14 and a lower tie plate 16. 8×8, 9×9 or 10×10 arrays of fuel rods are typical but, for clarity of illustration, only some of the fuel rods 12 are shown. The fuel rods 12 pass through a plurality of vertically spaced fuel rod spacers 18 (one shown) which provide intermediate support to retain the elongated fuel rods 12 in spaced relation and to restrain the lateral vibration.

Each of the fuel rods 12 is formed of an elongated tube containing a column of nuclear fuel 20. A plenum at the upper end of the fuel rod contains a spring 22 which maintains the column of fuel in position. The fuel rods 12 are sealed by upper and lower end plugs 24 and 26. The lower end plugs 26 are formed with a taper for registration and support within cavities 28 in the lower tie plate 16. Upper end plugs 24 are formed with extensions 30, the upper ends of which fit into support cavities in the upper tie plate 14.

Several of the support cavities 28 in the lower tie plate 16 are formed with threads to receive the end plugs of certain fueled tie rods 12' having threaded end plug shanks 32. Extensions 34 of the end plugs 24 of these same fueled tie rods are elongated to pass through the cavities in the upper tie plate 14 are formed with threads to receive retaining nuts 36. Fitted on the extensions 34 between the upper end plugs 24 and the upper tie plate 14 are expansion springs 38. In this manner, the upper and lower tie plates in the fuel rods are formed into a unitary structure.

The fuel assembly 10 further includes an open-ended, thin walled, tubular flow channel 40, of substantially square cross section, sized to form a sliding fit over the peripheral surfaces of the upper and lower tie plates 14, 16 and the spacers 18 so that the channel 40 can be mounted and removed from the fuel bundle without difficulty. Fixed to the top corner of the channel 40 is a tab 42 by which the channel 40 is fastened to a standard 44 of the upper tie plate 14 by screw 46. Since the channel 40 is not fastened to the lower tie plate 24, the upper end of the channel 40 is free to move with respect to the lower tie plate 16, in the event of movement of the upper end of the fuel assembly 10.

The lower tie plate 16 is formed with a downwardly extending nose piece 48 which is tapered to engage a fuel assembly support socket (not shown). The lower end of the nose piece 48 is formed with an opening 50 to receive pressurized water so that it flows upward among the fuel rods.

To aid in equalizing neutron moderation, the fuel assembly 10 is fitted with at least one large water tube 52 for conveying relatively cool water upwardly through the central region of the fuel assembly. The water rod 52, like the fuel rods, extends between and is supported by the upper and lower tie plates 14, 16, respectively. In this prior art arrangement, the water tube is provided with a plurality of holes 54 at its lower end which provide an inlet for water into the tube, while the upper end of the water tube is provided with a plurality of holes 56, 58 which provide an exit for the water flowing therein near the upper end of the fuel column 20 within the fuel rods. With this background, the discussion below with respect to the schematic drawings shown in FIGS. 2–8, all of which relate to water rod configurations, will be readily understood by those skilled in the art.

Figure 2:
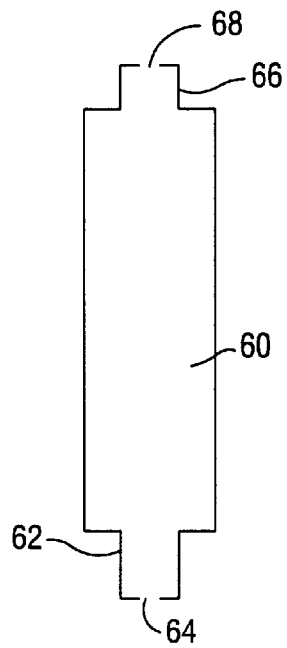
FIG. 2 is a schematic side elevation of a conventional water rod similar to that shown in FIG. 1.

The schematic diagram in FIG. 2 represents a water rod similar to that illustrated in FIG. 1. More specifically, the water rod 60 has a narrowed lower end 62 with one or more inlet holes 64, while the upper end of the water rod also includes a narrowed portion 66 with one or more outlet holes 68. The placement of these holes at the top and bottom of the water rod imposes the full bundle pressure drop to drive flow through the water rod. When reactor flow reduces, the pressure difference driving liquid through the water rod is also reduced. This configuration, however, maintains very little vapor formation even for low flow conditions.

Figure 3:
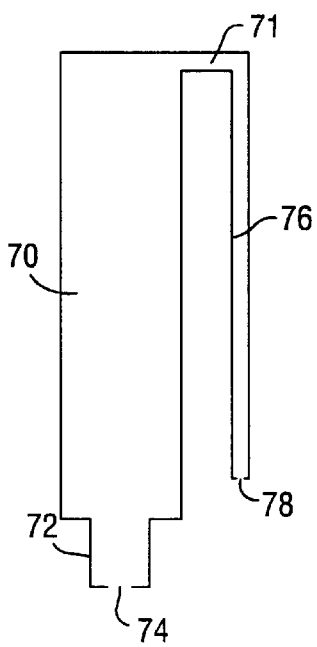
FIG. 3 is a schematic side elevation of another water rod.

The water rod configuration in FIG. 3 has been developed to have varying amounts of steam in the water rod at different reactor flow conditions. More specifically, the water rod 70 has a narrowed lower end portion 72 with one or more inlet holes or apertures 74. At the upper end of the water rod, however, there is added a small diameter downflow extension tube 76 offset from the uppermost end of the water rod 70 by a horizontal extension 71 and extending downwardly to a location proximate the narrowed lower portion 72 of the water rod (and hence at the bottom of the fuel column). One or more outlet apertures or openings 78 are provided at the lower end of the extension rod 76. In this arrangement, water flows upward through a large path and then downward through the small extension tube for essentially the full length of the fuel in the adjacent fuel rods before reaching the one or more exit holes 78. Note that in this configuration, there is only a short axial distance between the inlet holes 74 and the outlet holes 78, with resultant small imposed pressure differential across these holes. For low flow conditions, the downward flow tube 76 is predominantly filled with steam, and the fluid in the upward path is supported like a standpipe with a low pressure differential. The resultant liquid content in the water rod 70 is thus quite low, being proportional to the imposed pressure differential. For normal operation, the small downflow tube 76 and significant outlet flow restriction combine to severely limit water rod flow. Thus, this design results in significant steam formation in the water rod with associated unfavorable fuel efficiency, under normal operation conditions.

Figure 4:
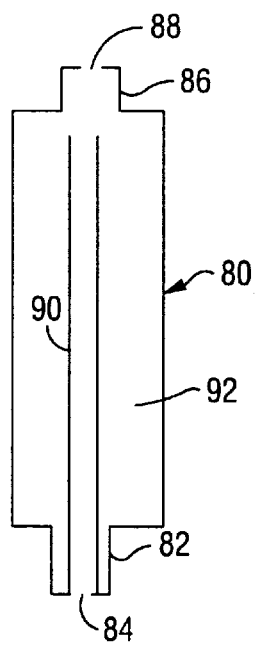
FIG. 4 is a schematic side elevation of still another water rod configuration.

Turning now to FIG. 4, there is illustrated another recent water rod design wherein the water rod 80 has a narrowed lower end 82 with one or more inlet holes 84 and a narrowed upper end portion 86 with one or more outlet holes 88. In this configuration, however, a central standpipe 90 extends from the inlet openings 84 upwardly to a location proximate the narrowed upper end portion 86. With flow restrictions typical of current designs, sufficient water rod flow is allowed at normal operating conditions to avoid steam formation. For low flow conditions, it was contemplated that the annular region outside of the standpipe 90 would fill with steam when the imposed pressure differential drops below that necessary to spill liquid over the top of the standpipe. Analyses have indicated, however, that under such conditions, liquid will flow backward through the upper outlet hole or holes 88 and refill the annular region 92 outside the standpipe 90. Since this region 92 has no bottom drain, it can potentially collect even more liquid than current water rod designs under similar conditions.

The configurations illustrated in FIGS. 3 and 4 highlight the difficulty in designing water rods that achieve negligible vapor content at normal reactor operating conditions, while providing sufficient vapor content at low reactor flow rates.

In connection with the present invention, it has been determined that the locations of the inlet and outlet holes, as well as the flow areas and hydraulic characteristics of the upflow and downflow paths are most important. The imposed pressure differential across an SWR is in fact determined by the placement of the inlet and outlet holes relative to the fuel bundle. Designs with higher imposed pressure differential will cause the SWR transitions to occur at lower reactor flow rates.

One method for changing the imposed pressure differential is by locating the inlet holes above or below the lower tie plate (LTP). The latter configuration adds the LTP pressure drop to the imposed pressure differential on the SWR. Another method for changing the imposed pressure differential is by varying the elevation of the outlet holes. The imposed pressure differential increases as the outlet holes are moved further up the fuel bundle. However, since this also shortens the length of the downflow region (which is steam filled during standpipe mode of operation) it results in somewhat higher liquid content in the SWR during standpipe mode of operation. Ultimately, raising the outlet hole elevation sufficiently will result in SWR designs that have no significant improvement over current designs.

Conversely, lowering the outlet holes too near to the inlet can result in unfavorable designs that are unable to transition back from standpipe mode to siphon mode, even at full reactor flow rates. Preferred locations for the downflow outlet holes fall in the range 35% to 65% of the fuel column height. Within that range, however, outlet holes should be located just above the fuel bundle spacers (element 18 in FIG. 1). Since pressure changes between spacers are relatively small compared to local spacer losses, placing outlet holes just above spacers provides added downflow length for a small penalty in imposed pressure differential.

Turning now to FIGS. 5–8, specific exemplary siphon water rods in accordance with this invention are illustrated. In the first exemplary embodiment shown in FIG. 5, the water rod 94 has a narrowed lower end portion 96 with one or more inlet apertures or openings 98 which are located adjacent and above the lower tie plate. At the upper end of the water rod 94, a return or downward flow tube 100 extends downwardly from the uppermost end of the water rod, similar to the extension 76 shown in FIG. 3. In this arrangement, however, the downward extension 100 is of significantly larger diameter and also terminates approximately midway along the length of the water rod 94 (and approximately midway along the length of the fuel columns in the fuel rods) with flow exiting one or more holes or exit openings 102. Raising outlet hole elevation increases SWR liquid content somewhat during standpipe mode and causes operating mode transitions to occur at lower reactor flows.

As a practical matter, the return path or extension 100 could be contained within the cross sectional area of a single water rod. Such an arrangement is shown, for example, in FIG. 6 where the downward return tube 104 lies within the water rod 106 with one or more outlet openings or apertures 108 located approximately midway along the water rod 106. The extension 104 has an open top portion 110 so that fluid flowing upwardly through the water rod 106 can spill into the downward extension 104 and exit through the one or more apertures or openings 108. As in the previously described embodiments, the water rod 106 has a narrowed lower end portion 112 with one or more inlet holes or openings 114.

Figure 5:
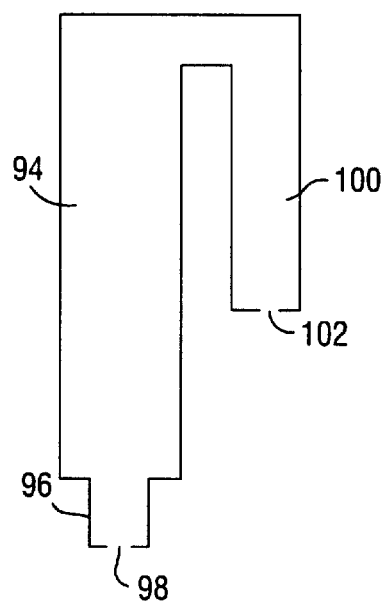
FIG. 5 is a schematic side elevation of a siphon water rod in accordance with a first embodiment of this invention.
Figure 6:
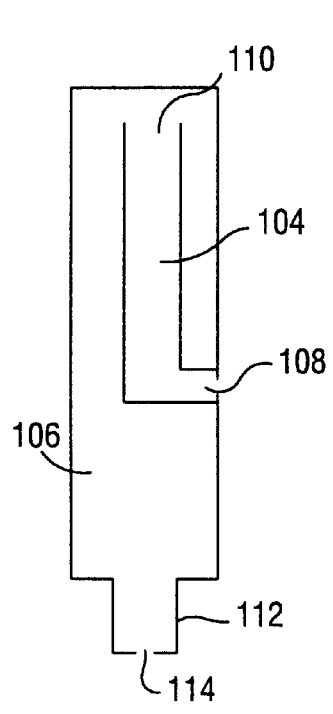
FIG. 6 is a schematic side elevation of a siphon water rod in accordance with a second exemplary embodiment of this invention.
Figure 7:
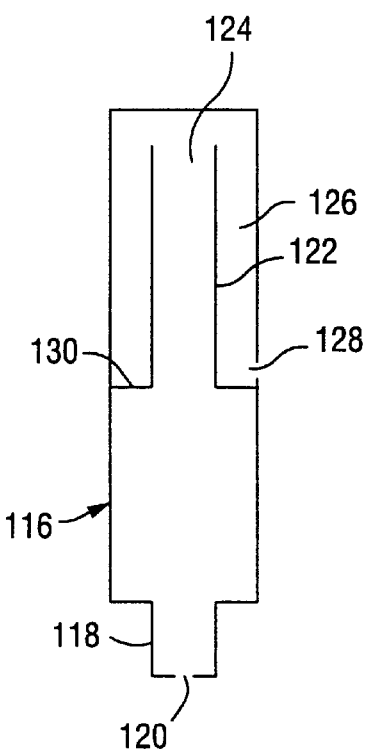
FIG. 7 is a schematic side elevation of a siphon water rod in accordance with a third exemplary embodiment of the invention.

Turning now to FIG. 7, another siphon water rod similar to that shown in FIGS. 5 and 6 is illustrated but wherein the return tube takes the form of an outer annulus. More specifically, the siphon water rod 116 of FIG. 7 includes a narrow lower end portion 118 with one or more inlet openings 120. Internally of the water rod 116, there is a narrowed upper end portion 122 which terminates at an open upper end 124. Surrounding the narrowed upper portion 122, is a substantially closed annular region 126 with one or more outlet exits or apertures 128 located substantially midway along the length of the water rod 116, just above a radial shoulder 130 where the narrowed upper portion 122 commences.

Figure 8:
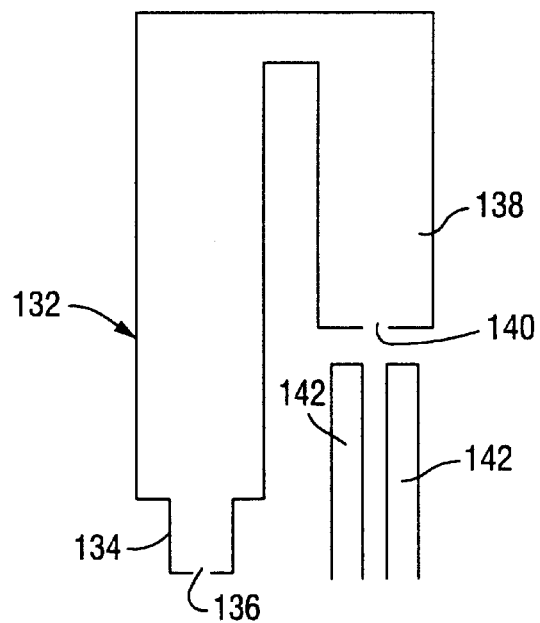
FIG. 8 is a schematic side elevation of a siphon water rod in accordance with a fourth exemplary embodiment of the invention.

FIG. 8 illustrates a siphon water rod configuration similar to that shown in FIG. 5. The shortened downflow tube of this invention permits usage in a fuel bundle assembly which incorporates part length fuel rods (PLR's) in the region below the downflow tube. Thus, the arrangement in FIG. 8 includes a water rod 132 with a narrowed lower end portion 134 with one or more inlet holes or openings 136. The downflow path is formed by a substantially similar diameter extension tube 138 having one or more exit openings or holes 140 at the lower end of the downflow path. Note that the exit hole or openings 140 are again located substantially midway along the length of the main water rod 132 (and approximately half way along the fuel columns within the fuel rods). In this arrangement, the fuel assembly includes one or more conventional partial length fuel rods 142 which terminate at a location proximate the outlet openings or holes 140.

As indicated, the disclosed siphon water rods in accordance with this invention have bimodal states. The water rod operates in "siphon mode" when reactor flows are high enough for the imposed pressure differential to maintain the water rod filled with liquid. The water rod operates in "standpipe mode" when the imposed pressure differential decreases sufficiently to allow steam generation in the water rod to break the siphon effect. When the imposed pressure differential cycles from high to low and back to high (i.e., as reactor flow cycles down and up again), there is some hysteresis in the transitions between these bimodal states. Changing from the standpipe mode requires the imposed pressure differential to be greater than the density head of the upward path completely filled with liquid. Beyond that transition point, the siphon effect will cause the water rod flow to increase rapidly. However, once the siphon effect is operative, the siphon mode can be maintained even though the imposed differential is decreased somewhat below the prior transition point.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel bundle assembly for a boiling water nuclear reactor comprising a plurality of fuel rods having respective fuel columns therein, and arranged in an ordered array, extending between upper and lower support structures, said plurality of fuel rods enclosed within a hollow, open-ended channel member; at least one water rod supported on the lower support and extending upwardly toward said upper support, said at least one water rod having an upward flow path including at least one inlet at a lower end of said upward flow path but no outlets in said upward flow path, and a downward flow path including at least one outlet located only at a lower end of said downward flow path, said outlet located in a range of 35% to 65% of the height of the fuel column; wherein said upward flow path is defined by at least first and second tube portions of relatively larger and smaller diameters, and said downward flow path is defined by an annular chamber surrounding the tube portion of relatively smaller diameter.

2. The assembly of claim 1 wherein said fuel rods are supported by a plurality of spacers, and wherein said at least one outlet in said downward path is located above a respective one of said spacers in said range.

3. A fuel bundle assembly for a boiling water nuclear reactor comprising a plurality of fuel rods having respective fuel columns therein, and arranged in an ordered array, extending between upper and lower support structures, said plurality of fuel rods enclosed within a hollow, open-ended channel member; at least one water rod supported on the lower support and extending upwardly toward said upper support, said at least one water rod having an upward flow path defined by upper and lower relatively narrow portions and a middle relatively wider portion; and a downward flow path surrounding the upper relatively narrow portion of said upward flow path, said downward flow path having at least one outlet located in a range of 35% to 65% of the height of the fuel columns.

4. The assembly of claim 3 wherein no additional outlets are provided in said water rod.

* * * * *

UNITED STATES PATENT AND TRADEMARK OFFICE
CERTIFICATE OF CORRECTION

PATENT NO.   : 6,487,266 B1
DATED        : November 26, 2002
INVENTOR(S)  : Dix et al.

It is certified that error appears in the above-identified patent and that said Letters Patent is hereby corrected as shown below:

Column 1,
Line 27, delete "modem" and insert -- modern --.
Line 53, delete "fill" and insert -- full --.

Signed and Sealed this

First Day of April, 2003

JAMES E. ROGAN
*Director of the United States Patent and Trademark Office*